(12) United States Patent  
Fukuda et al.

(10) Patent No.: US 11,742,545 B2  
(45) Date of Patent: Aug. 29, 2023

(54) BATTERY MODULE

(71) Applicant: FDK CORPORATION, Tokyo (JP)

(72) Inventors: Yunosuke Fukuda, Tokyo (JP); Naoto Kawaguchi, Tokyo (JP); Yoshiro Saito, Tokyo (JP)

(73) Assignee: FDK CORPORATION, Tokyo (JP)

( * ) Notice: Subject to any disclaimer, the term of this patent is extended or adjusted under 35 U.S.C. 154(b) by 139 days.

(21) Appl. No.: 16/770,520

(22) PCT Filed: Nov. 15, 2018

(86) PCT No.: PCT/JP2018/042352  
§ 371 (c)(1),  
(2) Date: Jun. 5, 2020

(87) PCT Pub. No.: WO2019/116819  
PCT Pub. Date: Jun. 20, 2019

(65) Prior Publication Data  
US 2020/0313125 A1 Oct. 1, 2020

(30) Foreign Application Priority Data  
Dec. 13, 2017 (JP) ................................. 2017-238731

(51) Int. Cl.  
*H01M 50/284* (2021.01)  
*H01M 50/202* (2021.01)  
*H01M 50/216* (2021.01)

(52) U.S. Cl.  
CPC ....... *H01M 50/216* (2021.01); *H01M 50/202* (2021.01); *H01M 50/284* (2021.01); *H01M 2220/30* (2013.01)

(58) Field of Classification Search  
CPC .................................................. H01M 50/216  
See application file for complete search history.

(56) References Cited

U.S. PATENT DOCUMENTS 5,558,679 A * 9/1996 Tuttle ................. H01M 50/216  
29/623.1  
5,735,040 A 4/1998 Ochi et al.

FOREIGN PATENT DOCUMENTS

| CN | 103578166 A | 2/2014 |
|---|---|---|
| JP | 53096624 U | 8/1978 |

(Continued)

OTHER PUBLICATIONS

International Search Report and Written Opinion dated Feb. 12, 2019, for corresponding PCT Application No. PCT/JP2018/042352.

(Continued)

*Primary Examiner* — Maria Laios  
*Assistant Examiner* — Jordan E Berresford  
(74) *Attorney, Agent, or Firm* — Kinney & Lange, P.A.

(57) ABSTRACT

A battery module according to the present invention includes: a case body including a flat plate portion and a base portion projecting from the flat plate portion; a circuit board including a through-hole formed in a thickness direction and secured to the case body, the base portion being inserted into the through-hole; and a battery secured to and placed on the base portion, in which the battery is a flat battery with a coin shape or a button shape, and electrode plates connected to each of the positive and negative poles of the battery are connected to the circuit board to supply a power source to electronic components disposed on the circuit board.

10 Claims, 6 Drawing Sheets

(56) References Cited

FOREIGN PATENT DOCUMENTS

| | | | | |
|---|---|---|---|---|
| JP | 56069771 | A | 6/1981 | |
| JP | S5669771 | * | 6/1981 | .......... H01M 50/216 |
| JP | 61-169955 | U | 10/1986 | |
| JP | 61-206261 | U | 12/1986 | |
| JP | 03-86562 | U | 9/1991 | |
| JP | H0722012 | A * | 1/1995 | |
| JP | 09259852 | A | 10/1997 | |
| JP | 10199499 | A | 7/1998 | |
| JP | 2007242629 | A | 9/2007 | |
| JP | 2011192426 | A | 9/2011 | |
| JP | 2014011049 | A | 1/2014 | |
| JP | 2017183004 | A | 10/2017 | |
| WO | 2008120455 | A1 | 10/2008 | |

OTHER PUBLICATIONS

Extended European Search Report dated Sep. 10, 2021, for corresponding European Application No. 18889409.1, six pages.

* cited by examiner

BATTERY MODULE

CROSS-REFERENCE TO RELATED APPLICATION(S)

This application is the national phase of PCT Application No. PCT/JP2018/042352 filed on Nov. 15, 2018, which in turn claims priority to Japanese Application No. 2017-238731 filed on Dec. 13, 2017, the entire disclosures of which are incorporate by reference herein.

BACKGROUND

Technical Field

The present disclosure relates to a battery holding structure and particularly to a structure of a battery module in which a battery is mounted on a circuit board.

Background Art

Many electronic devices use a battery module in which a flat battery with a shape called a coin shape or a button shape is mounted on a surface of a multilayer circuit board. In many of the electronic devices, a predetermined circuit is configured by mounting the battery along with other electronic components on a mounting surface formed on the surface of the multilayer circuit board.

Since such a battery module requires height reduction and case accommodation properties, a battery is mounted directly on the surface of the multilayer circuit board using electrode plates connected to each of the positive and negative electrodes of the battery in some cases.

According to the aforementioned procedure for mounting the battery module, a battery chamber penetrating the circuit board in a thickness direction is formed first, and through-holes are further formed at a peripheral edge portion of the battery chamber. Then, the electrode plates connected to each of the positive and negative electrodes of the battery are secured to the through-holes in the circuit board with the battery accommodated in the battery chamber sandwiched therebetween, thereby holding the battery on the circuit board. Such a mounting technique is disclosed in Patent Document 1, for example.

On the other hand, the aforementioned mounting technique requires the electrode plates connected to each of the positive and negative electrodes and the circuit board to support the weight of the battery since the electrode plates themselves connected to each of the positive and negative electrodes are secured directly to the circuit board to hold the battery.

PRIOR ART DOCUMENT

Patent Document

Patent Document 1: Japanese Patent Laid-Open No. 2007-242629

SUMMARY

However, in order to achieve height reduction of the battery module and to improve the case accommodation properties, with the above-mentioned mounting technique, thickness reduction and area saving of the circuit board have also been promoted, and there is a trend that mechanical strength of the circuit board is degraded. Also, the electrode plates and the circuit board cannot sufficiently support the weight of the battery in the circuit board with a further reduced thickness and a further saved area, and a problem that the battery module loses an energizing function due to damage of the electrode plates or dropping of the battery has become apparent.

An object of the present disclosure is to provide a battery module with excellent shock resistance in which a battery configured to supply a power source to the circuit board is mounted on a multilayer circuit board while avoiding disadvantages due to damage of electrode plates and dropping of the battery.

A battery module according to a first aspect of the present disclosure includes: a case body including a flat plate portion and a base portion projecting from the flat plate portion; a circuit board including a through-hole formed in a thickness direction, the base portion being inserted into the through-hole; and a battery placed on and held by the base portion.

According to the present disclosure, it is possible to provide a battery module with excellent shock resistance in which a battery configured to supply a power source to a circuit board is mounted on the circuit board while avoiding disadvantages due to damage of electrode plates and dropping of the battery.

DETAILED DESCRIPTION

Embodiment

Figure 1:
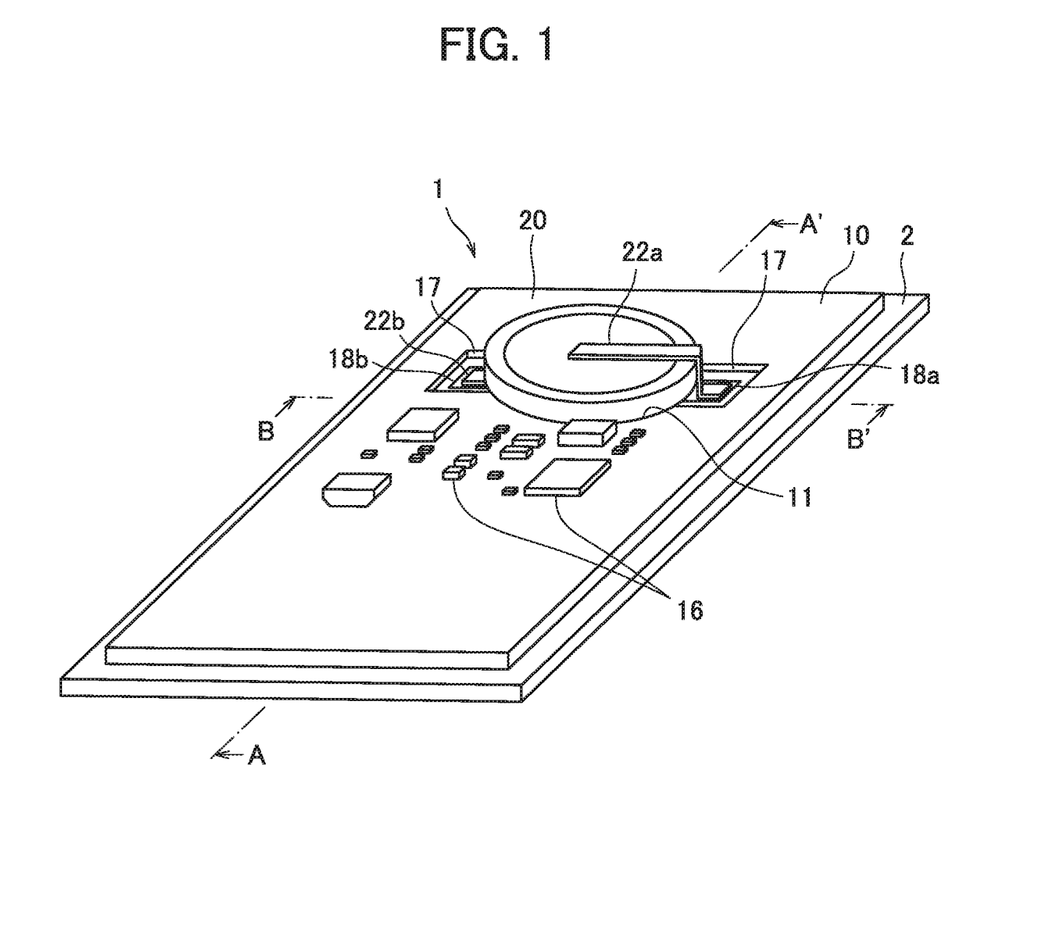
FIG. 1 is a perspective view illustrating an appearance of a battery module according to an embodiment of the present disclosure.
Figure 2:
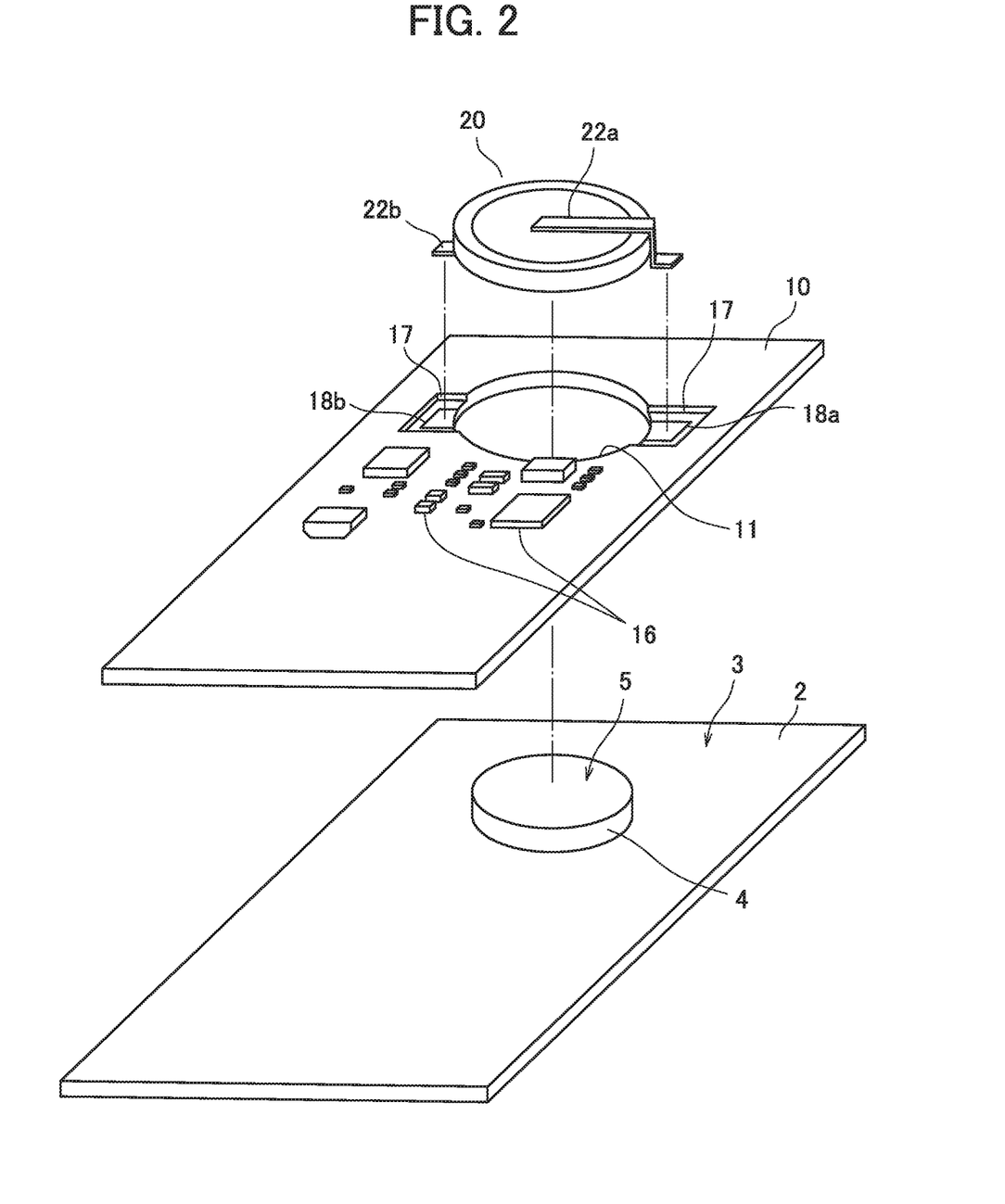
FIG. 2 is a perspective view in which the battery module illustrated in FIG. 1 is broken down into a case body, a multilayer circuit board, and a battery.
Figure 3:
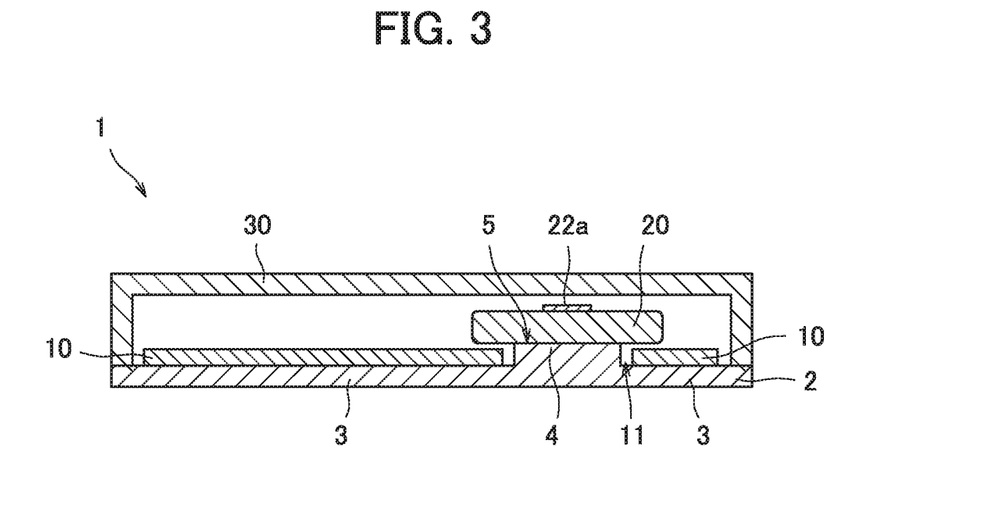
FIG. 3 is a sectional view of the battery module taken along the line segment A-A' in FIG. 1.
Figure 4:
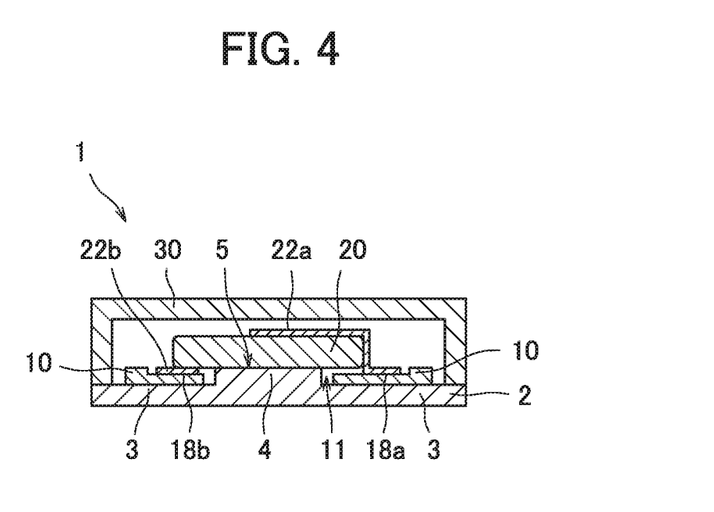
FIG. 4 is a sectional view of the battery module taken along the line segment B-B' in FIG. 1.

Hereinafter, an embodiment of the present disclosure will be described with reference to FIGS. 1 to 4. FIG. 1 illustrates an appearance of an entire battery module, FIG. 2 illustrates a diagram in which the main components of the battery module are broken down, FIG. 3 illustrates a section (an arrow view of A-A' in FIG. 1) of the battery module, and FIG. 4 illustrates a section (an arrow view of B-B' in FIG. 2) of a multilayer circuit board.

A battery module 1 is configured of a case body 2, a multilayer circuit board 10, a battery 20, and a lid portion 30 as can be seen in FIGS. 1 to 4. The multilayer circuit board 10 may be a single-layer circuit board with one conductive layer.

The case body 2 includes a flat plate portion 3 and includes a base portion 4 projecting upward from the flat plate portion 3, and an upper portion of the base portion 4 serves as an upper surface 5 that is substantially a flat surface. A plurality of electronic components 16 for forming the battery module are disposed on a surface side of the multilayer circuit board 10, and a through-hole 11 into which the base portion 4 of the case body 2 is inserted is formed such that the through-hole 11 penetrates therethrough in a thickness direction. Pad accommodating portions 17 recessed slightly from the surface in the thickness direction are provided in the surface of the multilayer circuit board 10 at peripheral edge portions of the through-hole 11, and pad portions 18a, 18b (not illustrated in FIG. 4) are provided in the pad accommodating portions 17.

Electrode plates 22a and 22b are attached to each of the positive and negative electrodes of the battery 20. The electrode plate 22a is connected to one electrode of the positive and negative electrodes provided on one surface of the battery 20 and extends until the electrode plate 22a projects to a side of the battery 20. Further, the electrode plate 22a is bent at a portion at which the electrode plate 22a projects to the side, extends toward the other surface on the side opposite of the one surface of the battery 20, is bent again toward the outside of the side of the battery 20 on substantially the same plane as the other surface of the battery 20, and then forms a portion connected to the pad portion 18a.

On the other hand, the electrode plate 22b is connected to the other electrode provided on the other surface of the battery 20, extends until the electrode plate 22b projects to the side of the battery 20, and forms a portion connected to the pad portion 18b. Here, the portion of the electrode plate 22a connected to the pad portion 18a and the portion of the electrode plate 22b connected to the pad portion 18b are formed at positions at which connection can be established in the same plane.

Also, the lid portion 30 is placed over the case body 2 such that the lid portion 30 covers the multilayer circuit board 10 and the battery 20. In other words, the case body 2 and the lid portion 30 cooperate to form space for accommodating the battery 20, and the battery 20 is disposed in the tightly sealed space.

As illustrated in FIG. 2, the multilayer circuit board 10 is placed such that the rear surface on the side opposite to the surface, on which the plurality of electronic components 16 are disposed, of the multilayer circuit board 10 is secured onto the flat plate portion 3 of the case body 2 in a state in which the base portion 4 of the case body 2 is inserted into the through-hole 11. At this time, since the thickness of the base portion 4 is thicker than the thickness of the multilayer circuit board 10 as illustrated in FIGS. 3 and 4, the base portion 4 penetrates through the through-hole 11 in the multilayer circuit board 10, and the base portion 4 projects further upward from the surface of the multilayer circuit board 10.

Also, the battery 20 is placed on and held by the upper surface 5 of the base portion 4 in the state in which the base portion 4 projects further upward from the surface of the multilayer circuit board 10. It is better for the battery 20 to be secured to the upper surface 5 via an adhesive material such as an adhesive. Also, since the upper surface 5 projects upward from the surface of the multilayer circuit board 10, it is possible to place the battery 20 such that the battery 20 is not brought into direct contact with the multilayer circuit board 10 even if the outer shape dimension of the upper surface 5 of the base portion 4 is set to be smaller than the outer shape dimension of the battery 20.

In other words, since the area of the upper surface 5 of the base portion 4 is large enough as long as it is possible to secure the battery 20 to the upper surface 5 and to support the weight of the battery, it is possible to minimize the size of the opening of the through-hole 11 into which the base portion 4 is inserted. This enables the area of the multilayer circuit board 10 to be reduced, also contributes to an improvement in mechanical strength of the multilayer circuit board 10.

Also, the shapes of the connecting portions of the electrode plates 22a and 22b at which the battery 20 is connected to the multilayer circuit board 10 are formed such that connection can be established on the same plane. Therefore, it is possible to place the battery 20 on the upper surface 5 of the base portion 4 such that the electrode plates 22a and 22b are brought into contact with the pad portions 18a and 18b on the surface of the multilayer circuit board 10, respectively.

In this manner, since the battery 20 adheres and is secured to the base portion 4 of the case body 2, the entire weight of the battery 20 is supported by the case body 2, and the battery does not drop. Also, a stress caused by the weight of the battery 20 is not imparted on the multilayer circuit board 10 and the electrode plates 22a and 22b. In this manner, damage of the multilayer circuit board 10 and the electrode plates 22a and 22b are curbed.

Also, if the multilayer circuit board 10 is secured to and placed on the flat plate portion 3 of the case body 2, the shape of the multilayer circuit board 10 is not deformed regardless of mechanical strength reduced due to a decrease in thickness, and no stress is thus applied to the electrode plates 22a and 22b from the multilayer circuit board 10. Therefore, as long as the electrode plates 22a and 22b have strength that is high enough to support the weights of the electrode plates themselves, the electrode plates 22a and 22b themselves are not damaged due to an external shock or the like imparted on the battery module 1, and electrical conductivity is thus not lost.

As described above, the present disclosure prevents damage of the electrode plates 22a and 22b of the battery 20 mounted on the multilayer circuit board 10 to supply a power source and prevents dropping of the battery 20. In this manner, it is possible to achieve a specific effect of providing the battery module 1 with excellent shock resistance capable of avoiding a loss of a power source supply function due to a shock from the outside of the module.

Modification Example

The aforementioned embodiment of the present disclosure has a structure in which the through-hole 11 in the multilayer circuit board 10 is smaller than the battery 20, the thickness of the base portion 4 of the case body 2 is thicker than the thickness of the multilayer circuit board 10, and the base portion 4 projects upward from the surface of the multilayer circuit board 10. However, there are various specifications for the thickness of the multilayer circuit board 10 and the outer shape of the battery 20, which configure the battery module 1.

Figure 5:
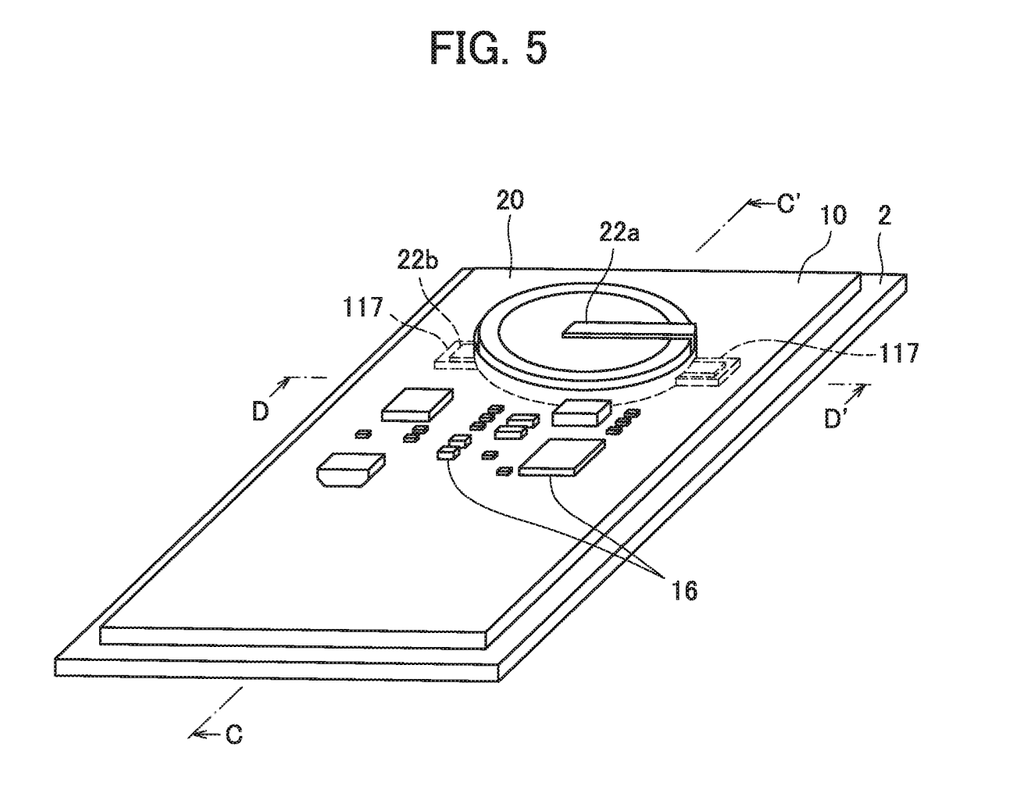
FIG. 5 is a perspective view illustrating an appearance of a battery module according to a modification example of the present disclosure.
Figure 6:
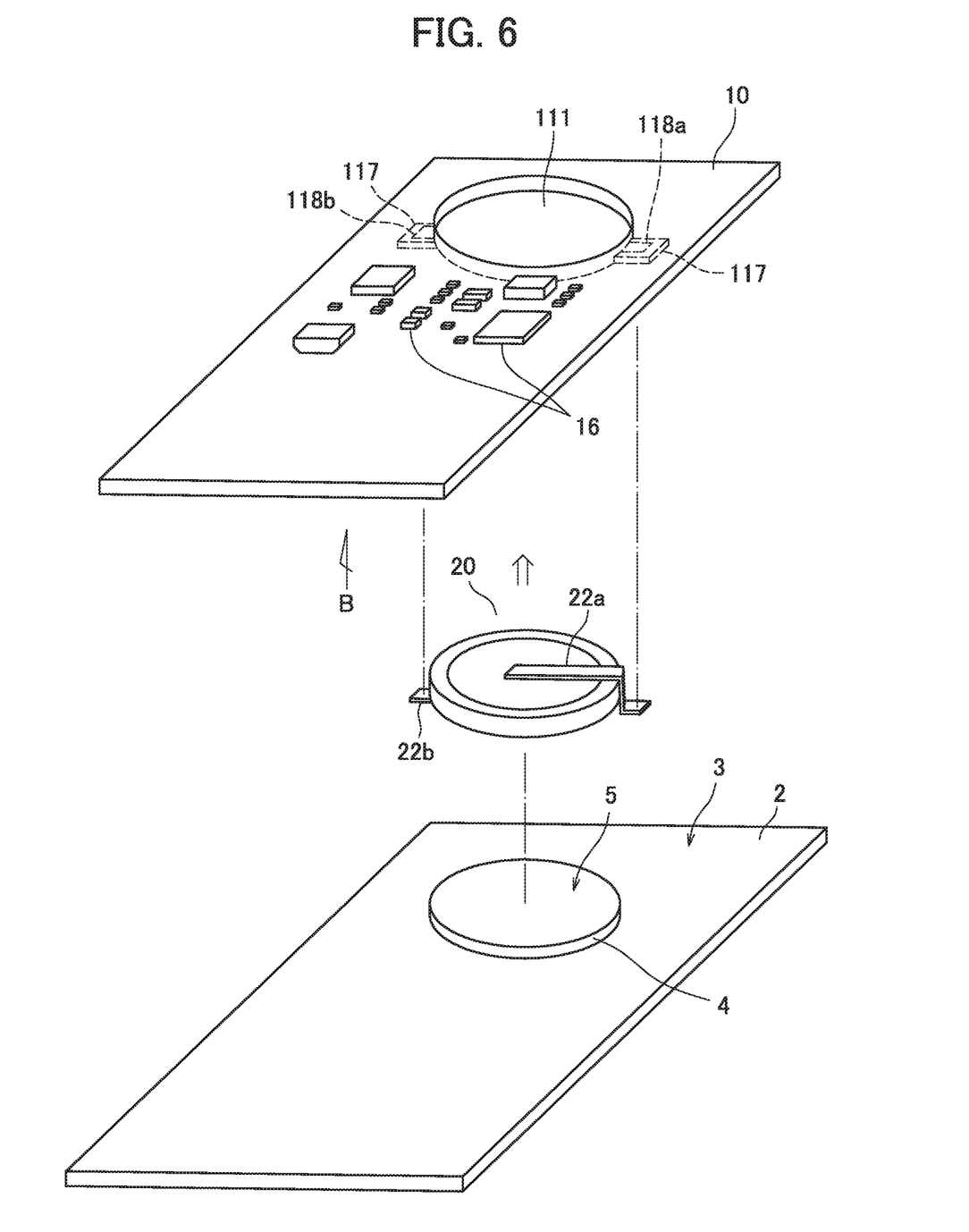
FIG. 6 is a perspective view in which the battery module illustrated in FIG. 5 is broken down into a case body, a multilayer circuit board, and a battery.
Figure 7:
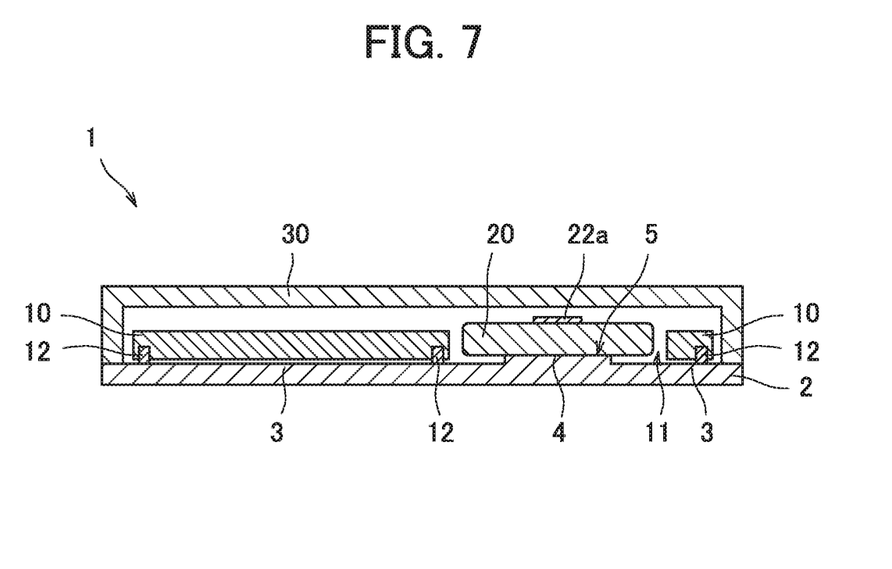
FIG. 7 is a sectional view of the battery module taken along the line segment C-C' in FIG. 5.
Figure 8:
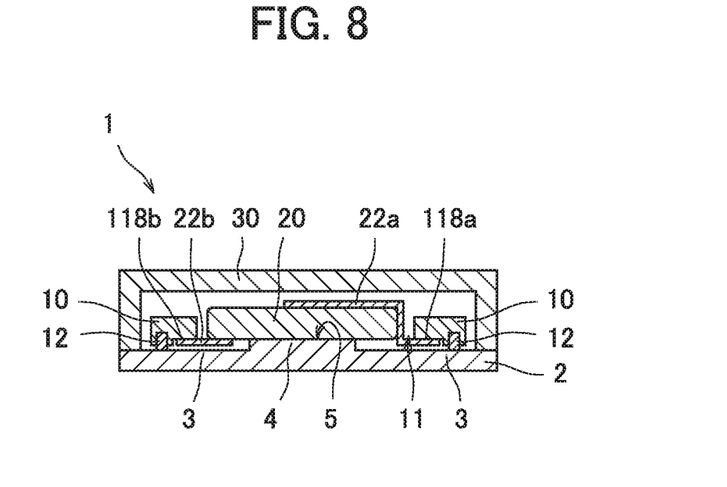
FIG. 8 is a sectional view of the battery module taken along the line segment D-D' in FIG. 5.

A modification example of the present disclosure is illustrated in FIGS. 5 to 8. FIG. 5 illustrates an appearance of an entire battery module, FIG. 6 illustrates a view in which the main components of the battery module are broken down, FIG. 7 illustrates a section (an arrow view of C-C' in FIG. 5) of the battery module, and FIG. 8 illustrates a section (an arrow view of D-D' in FIG. 5) of the multilayer circuit board. Description of the same components as the components in the aforementioned embodiment will be omitted.

As illustrated in FIG. 5, a through-hole 111 penetrating through a multilayer circuit board 10 in the thickness direction is placed in the multilayer circuit board 10. Also, pad accommodating portions 117 recessed slightly from the rear surface of the multilayer circuit board 10 in the thickness direction are provided in the rear surface at peripheral edges of the through-hole 11, and pad portions 118a and 118b are provided in the pad accommodating portions 117.

Here, the multilayer circuit board 10 is secured to and placed on a flat plate portion 3 of a case body 2 with a spacer 12 at a position at which a base portion 4 of the case body 2 can be inserted into the through-hole 111. At this time, space is formed between the multilayer circuit board 10 and the flat plate portion 3 of the case body 2, and the upper surface 5 of the base portion 4 is located at a position recessed from the surface of the multilayer circuit board 10, as illustrated in FIGS. 7 and 8.

Also, the battery 20 is placed on the upper surface 5 of the base portion 4 in the state in which the base portion 4 is recessed from the surface of the multilayer circuit board 10. It is better for the battery 20 to be secured to the upper surface 5 via an adhesive material such as an adhesive. Also, since the upper surface 5 of the base portion 4 is recessed from the surface of the multilayer circuit board 10, it is necessary to set the size of the opening dimension of the through-hole 111 to be larger than the outer shape dimension of the battery 20 such that the battery 20 is not brought into direct contact with the multilayer circuit board 10.

At this time, the upper surface 5 of the base portion 4 may be located inside the through-hole 111 such that the battery 20 is disposed such that the battery 20 occupies a part of the inside of the through-hole 111 in the multilayer circuit board 10. Also, the height of the base portion 4 may be lowered, and the upper surface 5 of the base portion 4 may be located below the rear surface of the multilayer circuit board 10, that is, outside the through-hole 111, such that the battery 20 is disposed to occupy the entire through-hole 111.

Here, the shapes of electrode plates 22a and 22b connected to each of the positive and negative electrodes of the battery 20 are formed such that portions of the electrode plates connected to the pad portions 118a and 118b can establish the connection on the same plane. Therefore, it is possible to place the battery 20 on the upper surface 5 of the base portion 4 such that the electrode plates 22a and 22b are brought into contact with the pad portions 118a, and 118b on the rear surface of the multilayer circuit board 10, respectively.

In the aforementioned embodiment of the present disclosure, the thickness of the battery module 1 is thicker than at least a sum of the thickness of the case body 2, the thickness of the multilayer circuit board 10, and the thickness of the battery 20 including the electrode plates 22a and 22b (see FIGS. 3 and 4).

On the other hand, the thickness of the battery module 1 does not depend on the multilayer circuit board 10 and depends only on the thickness of the case body 2 and the thickness of the battery 20 including the electrode plates 22a and 22b (see FIGS. 7 and 8), the modification example is advantageous for height reduction.

In this manner, it is possible to configure a more optimal battery module 1 through various modifications depending on specifications such as a thickness of the multilayer circuit board 10 and an outer shape of the battery 20 according to the present disclosure.

Note that both the multilayer circuit board 10 and the battery 20 are secured to and supported by the flat plate portion 3 and the base portion 4 of the case body 2 in the modification example as well.

Therefore, the modification example also prevents damage of the electrode plates 22a and 22b of the battery 20 mounted on the multilayer circuit board 10 to supply a power source and prevents dropping of the battery 20 similarly to the aforementioned embodiment. In this manner, it is possible to achieve a specific effect of providing the battery module 1 with excellent shock resistance capable of avoiding a loss of a power source supply function due to a shock from the outside of the module.

<Aspects of the Present Disclosure>

A battery module according to a first aspect of the present disclosure includes: a case body including a flat plate portion and a base portion projecting from the flat plate portion; a circuit board including a through-hole formed in a thickness direction, the base portion being inserted into the through-hole; and a battery placed on and held by the base portion.

According to a second aspect of the present disclosure, the base portion of the case body inserted into the through-hole in the circuit board penetrates through the through-hole and projects beyond the flat plate portion of the circuit board, in the aforementioned first aspect.

According to a third aspect of the present disclosure, an opening dimension of the through-hole in the circuit board is smaller than an outer shape dimension of the battery, in the aforementioned first or second aspect.

According to a fourth aspect of the present disclosure, the battery is secured to the base portion of the case body via an adhesive material, in any one of the aforementioned first to third aspects.

According to a fifth aspect of the present disclosure, an opening dimension of the through-hole in the circuit board is larger than an outer shape dimension of the battery, in the aforementioned first aspect.

According to a sixth aspect of the present disclosure, a part of the battery placed on and held by the base portion of the case body is disposed in the through-hole in the circuit board, in the aforementioned fifth aspect.

EXPLANATION OF REFERENCE SIGNS

1 Battery module
2 Case body
3 Flat plate portion
4 Base portion
5 Upper surface
10 Multilayer circuit board
11, 111 Through-hole
12 Spacer
16 Electronic component
17, 117 Pad accommodating portion
18a, 18b, 118a, 118b Pad portion
20 Battery
22a, 22b Electrode plate
30 Lid portion

The invention claimed is:
1. An apparatus comprising:
a case body including a flat plate portion and a base portion projecting from the flat plate portion, the flat plate portion and the base portion of the case body together making up a single integral element, and the base portion comprising an upper surface;
a circuit board including a through-hole formed in a thickness direction, the base portion being inserted into the through-hole, wherein the circuit board is arranged onto the flat plate portion of the case body in a state in which the base portion is inserted into the through-hole; and a battery secured on and held by the upper surface of the base portion, wherein the base portion of the case body inserted into the through-hole in the circuit board penetrates through the through-hole and projects beyond the circuit board, and wherein the base portion protrudes from the flat plate portion in the thickness direction by a base portion thickness greater than a corresponding thickness of the circuit board, such that the base portion provides clearance along the thickness direction between the circuit board and the battery.

2. The apparatus according to claim 1, wherein an opening dimension of the through-hole in the circuit board is smaller than an outer shape dimension of the battery.

3. The apparatus according to claim 1, wherein the battery is secured to the base portion of the case body via an adhesive material.

4. The apparatus according to claim 1, wherein an opening dimension of the through-hole in the circuit board is larger than an outer shape dimension of the battery.

5. The apparatus according to claim 4, wherein a part of the battery placed on and held by the base portion of the case body is disposed in the through-hole in the circuit board.

6. An apparatus comprising:
a case body including a flat plate portion and a base portion projecting from the flat plate portion, the base portion comprising an upper surface;
a circuit board including a through-hole formed in a thickness direction, the base portion being inserted into the through-hole such that at least part of the base portion projects into the through-hole in a plane of the circuit board perpendicular to the thickness direction, wherein the circuit board is arranged onto the flat plate portion of the case body in a state in which the base portion is inserted into the through-hole; and a battery secured on and held by the upper surface of the base portion, wherein the base portion of the case body inserted into the through-hole in the circuit board penetrates through the through-hole and projects beyond the circuit board, and wherein the base portion protrudes from the flat plate portion in the thickness direction by a base portion thickness greater than a corresponding thickness of the circuit board, such that the base portion provides clearance along the thickness direction between the circuit board and the battery.

7. The apparatus according to claim 6, wherein an opening dimension of the through-hole in the circuit board is smaller than an outer shape dimension of the battery.

8. The apparatus according to claim 6, wherein the battery is secured to the base portion of the case body via an adhesive material.

9. The apparatus according to claim 6, wherein an opening dimension of the through-hole in the circuit board is larger than an outer shape dimension of the battery.

10. The apparatus according to claim 9, wherein a part of the battery placed on and held by the base portion of the case body is disposed in the through-hole in the circuit board.

* * * * *